United States Patent [19]
Ballu

[11] Patent Number: 5,098,017
[45] Date of Patent: Mar. 24, 1992

[54] DEVICE FOR SPRAYING A SPRAYED PRODUCT ON PLANTS

[75] Inventor: Patrick J. M. Ballu, Reims, France

[73] Assignee: Nicolas Pulverisateurs, Bon Encontre, France

[21] Appl. No.: 460,002

[22] Filed: Jan. 2, 1990

[30] Foreign Application Priority Data

Jan. 4, 1989 [FR] France .................. 8900040

[51] Int. Cl.[5] ............................. B05B 7/24
[52] U.S. Cl. .................... 239/77; 239/172
[58] Field of Search ........... 239/77, 172; 180/53.1, 180/53.6

[56] References Cited

U.S. PATENT DOCUMENTS

| 3,092,327 | 6/1963 | Fish | 239/77 |
|---|---|---|---|
| 3,164,324 | 1/1965 | Bruinsma | 239/77 |
| 3,246,846 | 4/1966 | Funk et al. | 239/77 X |
| 4,172,557 | 10/1979 | Davis | 239/77 |
| 4,728,461 | 4/1988 | Stephenson et al. | 180/53.1 X |
| 4,805,927 | 2/1989 | Stephenson et al. | 180/53.1 X |

FOREIGN PATENT DOCUMENTS

| 0027295 | 4/1981 | European Pat. Off. . | |
| 1268566 | 6/1961 | France | 239/77 |
| 1394595 | 2/1965 | France . | |
| 2080282 | 11/1971 | France . | |
| 2278406 | 11/1972 | France . | |
| 284008 | 10/1952 | Switzerland . | |
| 828029 | 2/1960 | United Kingdom . | |
| 2016252 | 9/1979 | United Kingdom . | |

OTHER PUBLICATIONS

Tecnoma brochure entitled, "Pulsar Mistblowers", 1987 (French version), 1990 (English version).

Primary Examiner—Andres Kashnikow
Assistant Examiner—William Grant
Attorney, Agent, or Firm—Watson, Cole, Grindle & Watson

[57] ABSTRACT

The invention relates to a device for spraying a sprayable product on plants which includes turbine having a substantially vertical axis, preferably disposed between the side frames of a chassis, which conveys air via a channel that passes under a reservoir of sprayable product to emerge behind the latter via a horizontal outlet or a vertical outlet. Energy loss due to a change in direction of the air is thus minimized and yet very simple and lightweight mechanisms for driving the turbine are obtained.

9 Claims, 2 Drawing Sheets

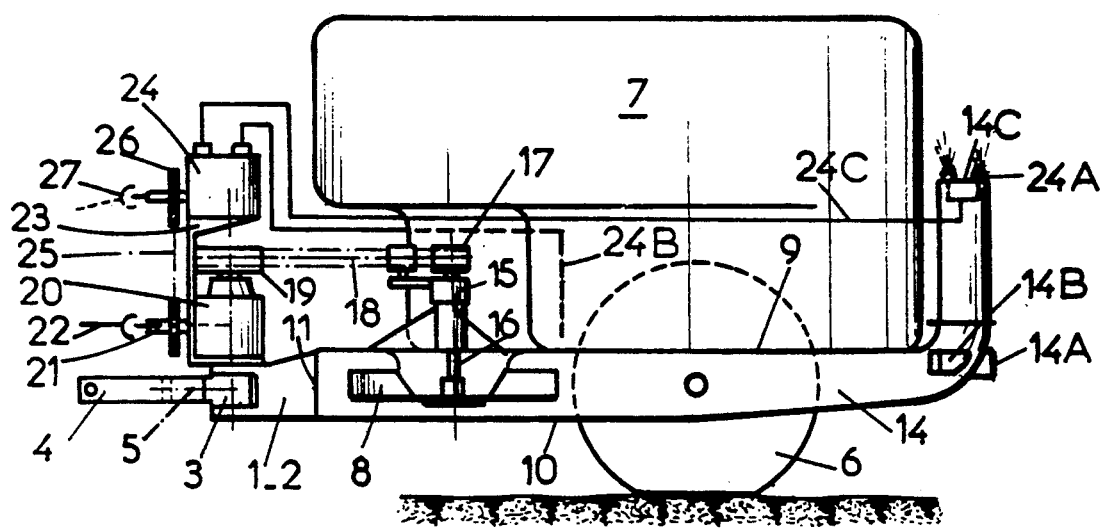
FIG.: 1
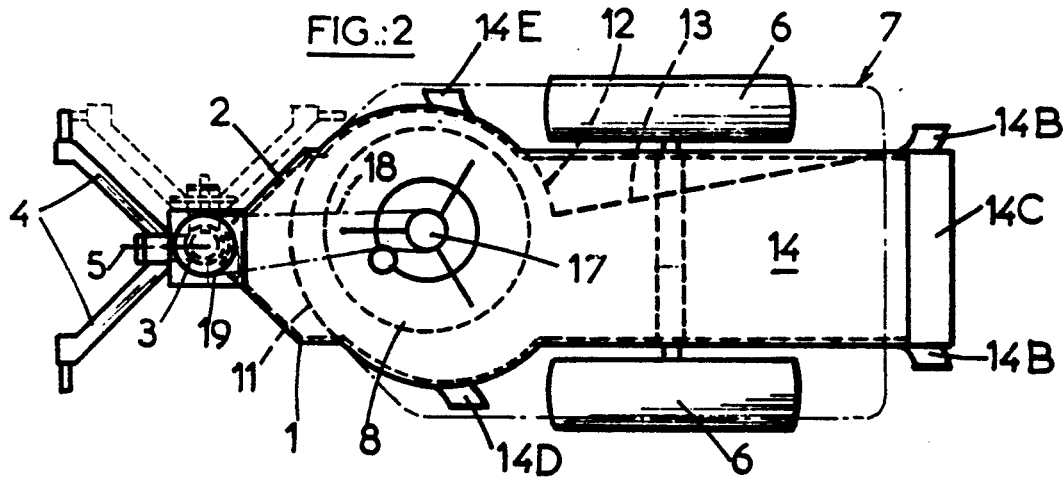
FIG.: 2

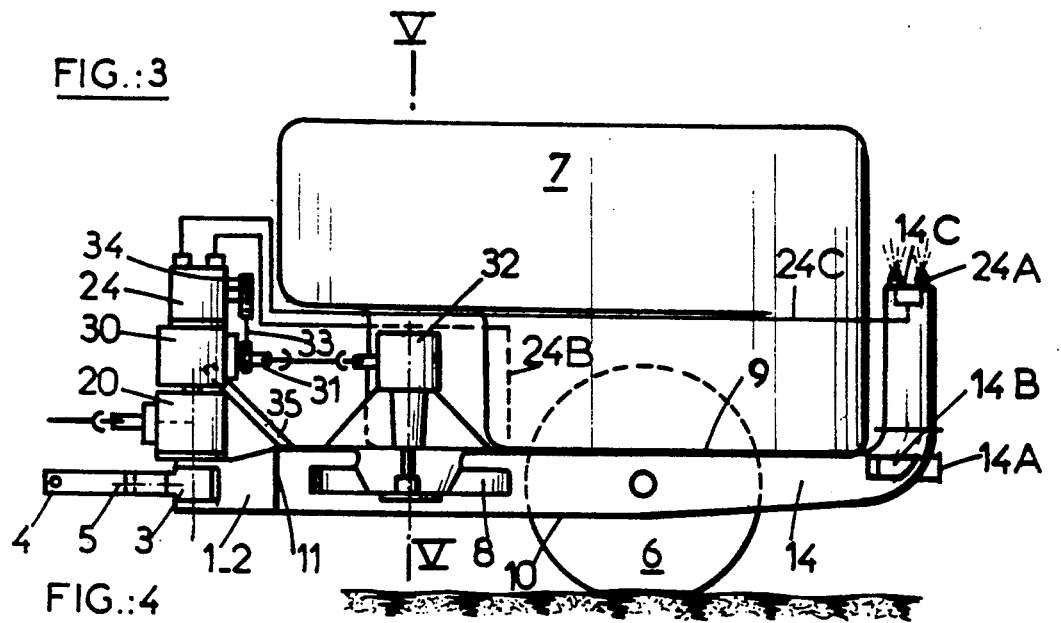
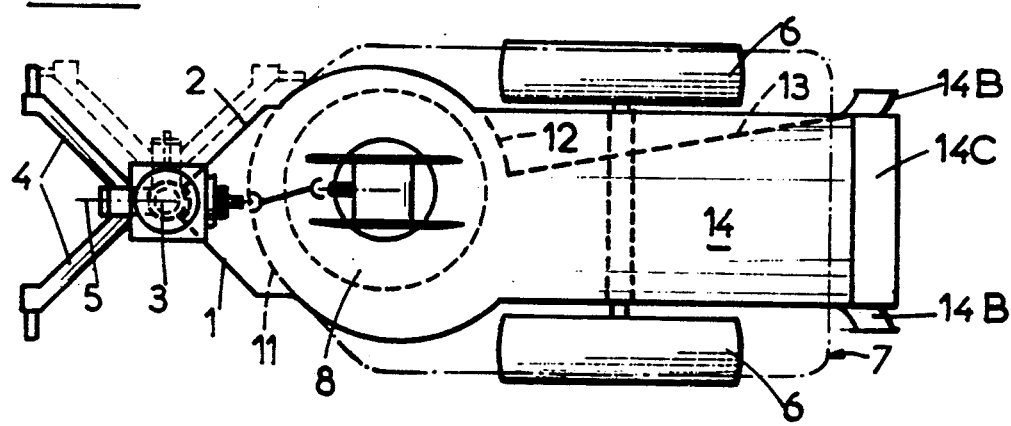
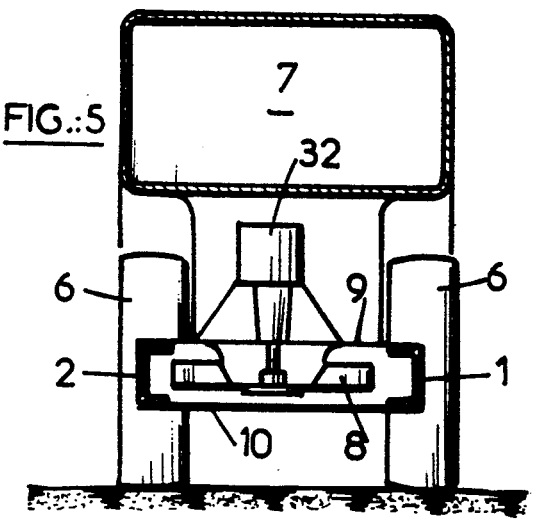
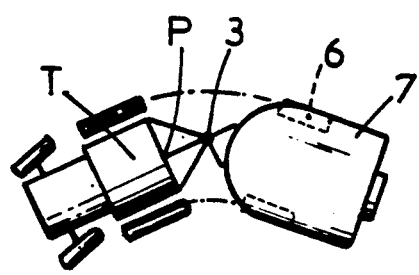

DEVICE FOR SPRAYING A SPRAYED PRODUCT ON PLANTS

The present invention relates to a device for spraying a product, for example a treatment product, on plants.

A wide variety of devices of the type indicated are known and are in current use. They generally comprise a chassis provided with means for attachment or coupling to the rear of a tractor or for fastening to a moveable platform, this chassis being equipped with wheels in the case of a so-called "hauled" device, or not having wheels in the case of a so-called "carried" device, a reservoir of product mounted on the chassis, a turbine capable of creating a flow of air, this turbine being carried by the chassis, means for guiding the flow of air which are capable of directing the flow of air emerging from the turbine towards the plants which it is desired to treat, and means for conveying the product in sprayed form into the flow of air emerging from these guide means.

Various arrangements are proposed provision may be made, for example, for the turbine, with the means for guiding the flow of air, to be located behind the device with its axis of rotation horizontal, most often longitudinal, rarely transverse. In this case, the reservoir is located a short distance from the tractor, which reduces the overhanging weight in the case of a carried apparatus. Fallout of product on the tractor and on the device itself is reduced to a minimum due to the concomitant displacement of the tractor and of the device. On the other hand, the system has the drawback of leading to air outlets which are in a relatively high position, which does not enable plants, such as fruit trees with low branches, to be treated from underneath. Moreover, the transmission of force from the power supply of the tractor to the turbine is difficult. In certain cases, a transmission shaft is provided, which is located underneath the reservoir. In other cases, the transmission shaft passes through the reservoir itself by means of leakproof seals. Transmissions involving electricity or the energy of a fluid could also be provided.

In other arrangements, the turbine, with a longitudinal horizontal axis, and the guide channels are placed in front of the device, that is to say near to the attachment or coupling system. The advantage is then gained of a short and inexpensive transmission, but the arrangement of the air outlets is no longer the most satisfactory. In fact, in the first place, they are still too high and, secondly, they give rise to fallout on the reservoir and the tractor.

Devices are also known in which the turbine is placed in front of the device, and a guide channel, passing underneath the reservoir, emerges at the rear of the assembly. This solution, which makes it possible to have very low air outlets and, moreover, combines the advantages of the above two arrangements, nevertheless has the drawback of a relatively significant loss of energy. In fact, the turbine, whose axis is horizontal and parallel to the direction of advance, projects a flow of air in a vertical plane perpendicular to the advance. It is then necessary to cause this flow of air to make a first right-angled turn in order to cause it to pass, parallel to the advance, underneath the reservoir, and then to cause it to undergo a second change in direction, also at a right angle, in order to convey it in a vertical plane so that it is sprayed laterally on the plants. This results in significant losses of energy. Moreover, all the devices indicated above comprise turbines with a horizontal axis and, regardless of their positioning, they occupy a relatively large space and increase the length of the device.

Devices are also disclosed in U.S. Pat. No. 3,164,324, U.S. Pat. No. 4,172,537 and FR-A-1,394,595, which comprise a turbine with a vertical axis and which is driven in rotation with the aid of an angle reverse mechanism, coaxial to the turbine and linked, via a horizontal transmission shaft, to the power supply of a tractor. When the fan is centrifugal, it is possible to obtain a low flow of air, for example just above the chassis.

When they are connected to the three points, all of these devices create a significant overhang at the rear of the tractor and, when they are towed, that is to say connected to the tractor by means of a shaft with an articulation, have, however, a drawback resulting from the existence of a horizontal transmission shaft parallel to the axis of the towed chassis. The connection between this transmission shaft and the power supply of the tractor is obtained via an assembly comprising a sliding shaft connected to the power supply via a universal joint and to the transmission shaft via another universal joint. This arrangement is satisfactory when the tractor moves approximately in a straight line, since it compensates for the defects of alignment in position and in direction between the power supply and the transmission shaft. This is not the case when there are tight turns, for example at the end of a line of crops, in which a 90-degree angle between the axes of the trailer and of the tractor is common. This leads to a non-homokinetic transmission of energy, that is to say jolts in the rotation of the turbine as well as a significant variation in the length of the sliding shaft which, if it is poorly lubricated, can lead to parts breaking. As a precaution, it is advisable to disengage the transmission when arriving at the end of a line and not to reconnect it until after the turn. This leads to an incomplete treatment of plants at the end of the line and wastage of time. However, the risk of a false maneuver giving rise to damage is not excluded.

The present invention aims to remedy these drawbacks.

SUMMARY OF THE INVENTION

The invention thus provides a device for spraying product on plants, comprising:

- a chassis carrying a coupling bar, capable of pivoting on an axis which is vertical relative to the chassis in order to connect the device to a tractor,
- a reservoir of product carried by the chassis,
- a turbine capable of creating a flow of air,
- a transmission shaft for driving the turbine from a power supply of the tractor by means of an angle reverse mechanism whose output shaft is vertical,
- channels for guiding the flow of air whose outlet is disposed at the rear of the chassis relative to the reservoir and which are capable of directing the flow of air emerging from the turbine towards the plants,
- and means for conveying the product, in sprayed form, into the flow of air emerging from the guide means,
- wherein said angle reverse mechanism is fitted in order to be able to pivot on the vertical axis of articulation of the bar for coupling to the chassis, or near to this axis, this angle reverse mechanism having an inlet connected to the power supply and an outlet connected to the turbine.

Thus the invention takes advantage of the presence of an angle reverse mechanism with a vertical outlet, which is known per se but, hitherto, has been placed elsewhere, and which is coaxial to a turbine with a vertical axis in order to solve the problem of the transmission of energy from a tractor to a trailer, even during a tight turn, while permitting a transfer of load from the trailer directly to the two lower attachment points of the device for coupling to the tractor, that is to say with a very small overhang relative to the rear axle of the tractor.

The invention may be applied regardless of the arrangement of the turbine, but a particularly simple structure is obtained if the turbine has a vertical axis. For example, it is possible to provide simply for the angle reverse mechanism to comprise a coaxial vertical output shaft which controls the turbine via an assembly with pulleys and belts. According to a better protected structure which is, nevertheless, slightly more expensive, the angle reverse mechanism comprises a coaxial vertical output shaft connected to the turbine via a second angle reverse mechanism which is fixed in rotation relative to the chassis and connected to the turbine via a transmission shaft.

Moreover, provision may be made for a pump intended to convey a liquid contained in the reservoir towards at least one sprayer located at an outlet of the air guide means to be placed substantially in the vertical pivoting axis of the angle reverse mechanism and for its input shaft to be kinematically connected to the input shaft or to the output shaft of said angle reverse mechanism or, possibly, of the second angle reverse mechanism. In this case, a perfectly homokinetic drive of the pump is obtained. Advantageously, in this case, means are provided for disengaging, at will, at least one of the members constituted by the turbine and the pump, leaving the other to function.

According to an advantageous embodiment, when the turbine has a vertical axis and is of the centrifugal or helical type the turbine has a vertical axis and is of the centrifugal or outward-flow type, the turbine, and the section adjacent to the turbine of the channel for guiding the flow of air, are placed at the same height above the ground as the side frames of the chassis, between the side frames of the chassis or parallel to the latter.

In this case, provision may also be made for the turbine and the adjacent section of the guide channels to be placed above the side frames of the chassis. In this case, the transmission of force between the angle reverse mechanism and the turbine may take place between the side frames, underneath the turbine.

Finally, a particularly advantageous arrangement consists in the vertical axis of articulation of the bar for coupling to the chassis being approximately in the center of the distance separating the axle of the wheels with which the chassis is equipped from the rear wheels of the tractor. Thus, when turning, the wheels of the trailer exactly follow the tracks of those of the tractor (the articulation is on the line bisecting the angle formed by the axles). This is a big advantage in the treatment of crops which are in close rows or where the turning places in the field are narrow. There is no longer any risk of catching on stakes or plants at the end of the rows once the tractor itself has "passed by".

The invention will now be described in more detail with the aid of practical examples which are illustrated by the figures.

BRIEF DESCRIPTION OF THE DRAWINGS

FIG. 1 is a diagram in elevation of a first embodiment of the device according to the invention, FIG. 2 is a diagrammatic plan view of the device in FIG. 1, FIG. 3 is view, similar to FIG. 1, of another embodiment, FIG. 4 is a plan view of the embodiment in FIG. 3, FIG. 5 is a diagrammatic section along the line V—V in FIG. 3, and FIG. 6 is a schematic plan view of the device connected to a tractor.

DETAILED DESCRIPTION OF THE PREFERRED EMBODIMENTS

The device shown in FIG. 1 comprises a chassis formed by two crossbeams 1, 2, whose section is the same as that which is indicated in FIG. 5 and which are joined at the front in order to carry a vertical shaft 3 on which is fitted a coupling bar 4, provided with a pivot 5, which permits limited clearances, the axis of the pivot 5 being parallel to the direction of advance.

The chassis is equipped with two wheels 6. It carries a reservoir 7 which can be filled with treatment liquid.

The vertical shaft 3 is substantially equidistant from the rear axle of the tractor, which is not shown, and from the axle carrying the wheels 6 with which the chassis is equipped.

A turbine 8 is disposed between the side frames 1 and 2, as is indicated in FIG. 5, and partly underneath and in front of a portion of the reservoir 7. It will be noted here that FIG. 5 refers to FIG. 3, but the arrangement of the turbine relative to the chassis, as will be seen hereinbelow, is identical in the embodiments in FIGS. 1 and 2, on the one hand, and in FIGS. 3 and 4, on the other hand. The outlet casing of the turbine 8 is limited on the outside, that is to say on the right and on the left, by the side frames 1 and 2 which have an adapted form. On the top and on the bottom, plates 9, 10, which bear on the side frames 1 and 2, limit the casing. Other vertical plates 11, 12, 13 define the course of the air emitted by the turbine so as to cause it to pass underneath the reservoir towards the rear. The channel 14 for guiding the air thus formed emerges at a horizontal outlet 14A towards the rear, at the level of the side frames, lateral horizontal outlets 14B, at the side level, and a vertical outlet 14C towards the top. Sprayers may be located at these outlets (see 24A at outlet 14C in FIGS. 1 and 3), or these outlets may be connected to venturis or deflectors for spraying liquid by means of flexible or rigid pipes, in a known manner. These flexible or rigid pipes, just like the venturis, are not shown. Moreover, it is clear that the invention is not limited to the direction of rotation of the turbine shown.

Additional air outlets located at the front, substantially at the same height above the ground as the outlets 14A and 14B and supplied directly from the casing, have been shown at 14D and 14E. These front outlets, which are optional, provide additional spraying at the lower part of the plants, at low cost.

The turbine 8 has a vertical axis and its suction is via the top. However, suction partly or totally via the bottom could be provided. This arrangement has the drawback of risking sucking in dust during dry weather, but is justified in the case of a cage centrifugal turbine or double or symmetrical centrifugal turbines. A turbine bearing has been shown at 15. The shaft 16 of the turbine carries pulleys 17 which are driven by transmission belts 18 connected to other pulleys 19 fitted on the vertical output shaft of an angle reverse mechanism 20. This angle reverse mechanism 20 is fitted on the coupling bar 4 so as to rotate with it on its vertical axis. Its face which is turned towards the tractor is provided with joining means 21 with a coupling bar 22 which can be secured to the power supply of the tractor, with the possible interposition of cardan joints and sliding means in order to facilitate coupling.

It is understood that, when the coupling bar pivots through 90° about the shaft 3, during a tight turn, the angle reverse mechanism 20 continues to be driven by the shaft 22 and the pulley 19 continues to drive the turbine by means of the belts 18 and the pulleys 17, and this takes place perfectly homokinetically.

A support 23, integrally attached to the housing of the angle reverse mechanism 20, carries a pump 24 whose function is to take liquid from the reservoir (see pipe 24B) and convey it to the outlet of the guide channels (see, e.g., pipe 24C which conveys liquid to the sprayers 24A at outlet 14C). The pump 24 is driven by the input shaft 21 of the angle reverse mechanism 20 with the aid of a transmission via belts 25 and pulleys 26 of the conventional type. Moreover, the pump 24 is provided with means 27 for directly linking to the power supply of the tractor, as shown in dotted lines, after having disconnected the belt 25 and the pulley 26. Thus, it is possible to drive, at will, either the turbine 8 or the pump 24, or both at the same time.

FIGS. 3 to 5 describe a device whose structure is the same as that in FIGS. 1 and 2. The difference resides solely in the method of driving the turbine 8 and the pump 24. In this second arrangement, the outlet of the angle reverse mechanism 20 drives a second angle reverse mechanism 30 whose output shaft 31 is connected to a third angle reverse mechanism 32 coaxial to the turbine and which drives the latter. Simultaneously, the shaft 31 drives the pump 24 by means of a belt 33 and a pulley 34.

Arms 35 lock the angle reverse mechanism 30 relative to the chassis.

This embodiment is less subject to wear than a transmission via belts and pulleys; on the other hand, it is less able to absorb the sudden variations in torque, for example on starting.

It will be noted that the arrangements and methods of driving the pump and the turbine are not linked together. In fact, it is possible to associate the mounting of the pump provided in FIG. 1 with the drive of the turbine shown in FIG. 3, or vice versa.

It will also be noted that angle reverse mechanisms disposed coaxially to the articulation of the coupling bar, like the angle reverse mechanisms 20 and 30 described hereinabove, could be used with a turbine disposed differently, for example with its axis in the direction of advance.

In the above text, a description has been given of a turbine 8 of the centrifugal type. A person skilled in the art will easily understand that it is possible, without difficulty, to use instead a helical turbine, or any other type of turbine, which provides, at its outlet, a substantially horizontal flow of air parallel to the advance and capable of passing underneath the reservoir, preferably between the side frames, without changing direction or with small changes in direction.

I claim:

1. An apparatus for spraying a sprayable product onto plants which comprises:
 a chassis which has a front end and a rear end and which includes two elongated side frame members and a coupling bar which extends forwardly of said side frame members and is pivotable about an axis which is perpendicular to said side frame members, said side frame members being generally horizontally oriented when said coupling bar is connected to a tractor,
 a reservoir for sprayable product mounted above said chassis,
 a turbine for providing a flow of air, said turbine including a drive shaft located in front of at least a portion of said reservoir and a rotor blade which is capable of providing a flow of air which is parallel with said side frame members,
 means providing an air flow channel which extends from said rotor blade rearwardly of said rotor blade and beneath said portion of said reservoir to an outlet located rearwardly of said reservoir, a portion of said air flow channel adjacent said turbine being positioned between said side frame members and extending in parallel therewith, and
 a pumping system for conveying sprayable product from said reservoir into air flowing through said air flow channel and out of said outlet onto said plants.

2. An apparatus as claimed in claim 1, including a drive means connected to said drive shaft of said turbine and connectable to a tractor to rotate said drive shaft and said rotor blade.

3. An apparatus as claimed in claim 2, wherein said drive means comprises a first angle reverse mechanism mounted on said chassis to be pivotable with said coupling bar, said angle reverse mechanism including an input shaft and an output shaft; a joining means for connecting said input shaft of said first angle reverse mechanism to a tractor; and a transmission means connecting the output shaft to said drive shaft of said turbine.

4. An apparatus as claimed in claim 3, wherein said drive shaft of said turbine extends perpendicularly to said side frame members and in parallel with said output shaft.

5. An apparatus as claimed in claim 4, wherein said pumping system includes a material pump, and including a drive belt extending between said input shaft of said angle reverse mechanism and said material pump to operate said material pump.

6. An apparatus as claimed in claim 5, including a bearing on said drive shaft, and wherein said transmission means comprises a belt which engages said bearing.

7. An apparatus as claimed in claim 6, wherein said drive means comprises a second angle reverse mechanism mounted on and operatively connected with said first angle reverse mechanism, said second angle reverse mechanism having an output shaft; a third angle reverse mechanism connected to said drive shaft, said third angle reverse mechanism having an input shaft; and wherein said transmission means comprises a transmission shaft operatively connecting said output shaft of said second angle reverse mechanism with said input shaft of said third angle reverse mechanism.

8. An apparatus as claimed in claim 7, wherein said pumping means includes a material pump, and including a drive belt extending between said output shaft of said second angle reverse mechanism and said material pump to operate said material pump.

9. An apparatus as claimed in claim 1, including support wheels mounted to said chassis near the rear end thereof and wherein said axis about which said coupling bar rotates is located about half way between said support wheels and the rear wheels of a tractor to which the apparatus is connected.

* * * * *